United States Patent
Kim

(10) Patent No.: US 12,087,953 B2
(45) Date of Patent: Sep. 10, 2024

(54) SECONDARY BATTERY

(71) Applicant: Samsung SDI Co., Ltd., Yongin-si (KR)

(72) Inventor: Joong Hun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 401 days.

(21) Appl. No.: 16/490,831

(22) PCT Filed: Feb. 14, 2018

(86) PCT No.: PCT/KR2018/001945
§ 371 (c)(1),
(2) Date: Sep. 3, 2019

(87) PCT Pub. No.: WO2018/164389
PCT Pub. Date: Sep. 13, 2018

(65) Prior Publication Data
US 2020/0006742 A1    Jan. 2, 2020

(30) Foreign Application Priority Data

Mar. 6, 2017 (KR) ................. 10-2017-0028522

(51) Int. Cl.
*H01M 50/553* (2021.01)
*H01M 50/103* (2021.01)
(Continued)

(52) U.S. Cl.
CPC ....... *H01M 50/147* (2021.01); *H01M 50/103* (2021.01); *H01M 50/176* (2021.01);
(Continued)

(58) Field of Classification Search
CPC ............ H01M 50/543; H01M 50/103; H01M 50/172; H01M 50/10; H01M 50/147;
(Continued)

(56) References Cited

U.S. PATENT DOCUMENTS 8,415,038 B2   4/2013   Kim et al.
8,691,424 B2   4/2014   Byun et al.
(Continued)

FOREIGN PATENT DOCUMENTS

JP       5699578 B2       4/2015
JP    2015-141896 A       8/2015
(Continued)

OTHER PUBLICATIONS

Korean Notice of Allowance for Application No. 10-2017-0028522, mailed Nov. 17, 2021, 2 pages.

*Primary Examiner* — Christian Roldan
(74) *Attorney, Agent, or Firm* — Lewis Roca Rothgerber Christie LLP

(57) ABSTRACT

Various embodiments of the present invention relate to a secondary battery and aim to simplify the structure of a terminal part to minimize the space taken up by parts inside a case. To this end, provided in the present invention is a secondary battery comprising: an electrode assembly for a prismatic secondary battery; a case for a prismatic secondary battery for accommodating the electrode assembly; a cap plate coupled to the case; and a terminal part which is coupled to a side portion of the electrode assembly and is extendedly bent from the side portion to an upper portion of the electrode assembly, wherein the terminal part includes a bent part which is bent upward from an end part connected to the upper portion of the electrode assembly to protrude out of the cap plate.

9 Claims, 4 Drawing Sheets

(51) Int. Cl.
*H01M 50/147* (2021.01)
*H01M 50/176* (2021.01)
*H01M 50/55* (2021.01)
*H01M 50/562* (2021.01)
*H01M 50/566* (2021.01)
*H01M 50/533* (2021.01)
*H01M 50/54* (2021.01)

(52) U.S. Cl.
CPC ......... *H01M 50/55* (2021.01); *H01M 50/553* (2021.01); *H01M 50/562* (2021.01); *H01M 50/566* (2021.01); *H01M 50/533* (2021.01); *H01M 50/54* (2021.01)

(58) Field of Classification Search
CPC ...... H01M 2/30; H01M 2/0217; H01M 2/024; H01M 2/04; H01M 2/06; H01M 50/142; H01M 50/55; H01M 50/553; H01M 50/562; H01M 50/566; H01M 50/54; H01M 50/538
USPC .......................................................... 429/179
See application file for complete search history.

(56) References Cited

U.S. PATENT DOCUMENTS

| | | | |
|---|---|---|---|
| 8,795,882 B2 | 8/2014 | Kambayashi et al. | |
| 9,040,192 B2 | 5/2015 | Lee et al. | |
| 9,537,121 B2* | 1/2017 | Kim | H01M 50/183 |
| 2006/0024578 A1* | 2/2006 | Lee | H01M 50/538 |
| | | | 429/208 |
| 2006/0115722 A1* | 6/2006 | Kim | H01M 50/538 |
| | | | 429/161 |
| 2006/0208700 A1* | 9/2006 | Kim | H01M 50/116 |
| | | | 320/128 |
| 2007/0141458 A1* | 6/2007 | Nagatani | H01M 50/553 |
| | | | 429/158 |
| 2009/0246620 A1 | 10/2009 | Lee et al. | |
| 2010/0203371 A1* | 8/2010 | Nagai | H01M 10/0525 |
| | | | 429/211 |
| 2011/0052939 A1* | 3/2011 | Kim | H01M 10/0431 |
| | | | 429/7 |
| 2011/0070471 A1* | 3/2011 | Cho | H01M 10/0431 |
| | | | 429/94 |
| 2011/0183167 A1* | 7/2011 | Moon | H01M 50/572 |
| | | | 429/62 |
| 2011/0200849 A1* | 8/2011 | Byun | H01M 10/0436 |
| | | | 429/7 |
| 2012/0052341 A1* | 3/2012 | Kim | H01M 50/147 |
| | | | 429/53 |
| 2012/0107678 A1* | 5/2012 | Kim | H01M 50/463 |
| | | | 429/186 |
| 2012/0148910 A1* | 6/2012 | Kambayashi | H01M 50/543 |
| | | | 429/179 |
| 2012/0156536 A1* | 6/2012 | Yamazaki | H01M 50/55 |
| | | | 429/96 |
| 2012/0177975 A1* | 7/2012 | Yageta | H01M 10/0583 |
| | | | 429/144 |
| 2012/0183840 A1* | 7/2012 | Lee | H01M 50/502 |
| | | | 429/158 |
| 2012/0189908 A1* | 7/2012 | Tsutsumi | H01G 11/82 |
| | | | 429/179 |
| 2012/0237817 A1* | 9/2012 | Kim | H01M 50/553 |
| | | | 429/158 |
| 2012/0270099 A1* | 10/2012 | Lee | H01M 50/579 |
| | | | 429/179 |
| 2013/0011708 A1* | 1/2013 | Ueki | H01M 10/0525 |
| | | | 429/94 |
| 2013/0149598 A1* | 6/2013 | Kim | H01M 50/116 |
| | | | 429/179 |
| 2013/0164574 A1* | 6/2013 | Kim | H01M 50/572 |
| | | | 429/61 |
| 2013/0252078 A1* | 9/2013 | Kim | H01M 50/148 |
| | | | 429/179 |
| 2014/0302380 A1* | 10/2014 | Song | H01M 10/0431 |
| | | | 429/158 |
| 2015/0214516 A1* | 7/2015 | Jang | H01M 50/502 |
| | | | 429/181 |
| 2015/0364731 A1* | 12/2015 | Yoo | H01M 10/0431 |
| | | | 429/94 |
| 2016/0126511 A1* | 5/2016 | Park | H01M 10/0431 |
| | | | 429/7 |
| 2016/0248073 A1* | 8/2016 | Jang | H01M 50/172 |
| 2017/0256821 A1* | 9/2017 | Suzuki | H01G 11/74 |
| 2019/0319295 A1* | 10/2019 | Kim | H01M 50/543 |
| 2020/0006742 A1* | 1/2020 | Kim | H01M 50/147 |

FOREIGN PATENT DOCUMENTS

| | | |
|---|---|---|
| KR | 100889769 B1 | 4/2004 |
| KR | 100599797 B1 | 12/2005 |
| KR | 10-2009-0103404 A | 10/2009 |
| KR | 10-2011-0095101 A | 8/2011 |
| KR | 10-1075333 B1 | 10/2011 |
| KR | 10-2012-0106539 A | 9/2012 |
| KR | 10-1479607 B1 | 1/2015 |
| KR | 10-2015-0029544 A | 3/2015 |
| KR | 10-2017-0000384 A | 1/2017 |

* cited by examiner

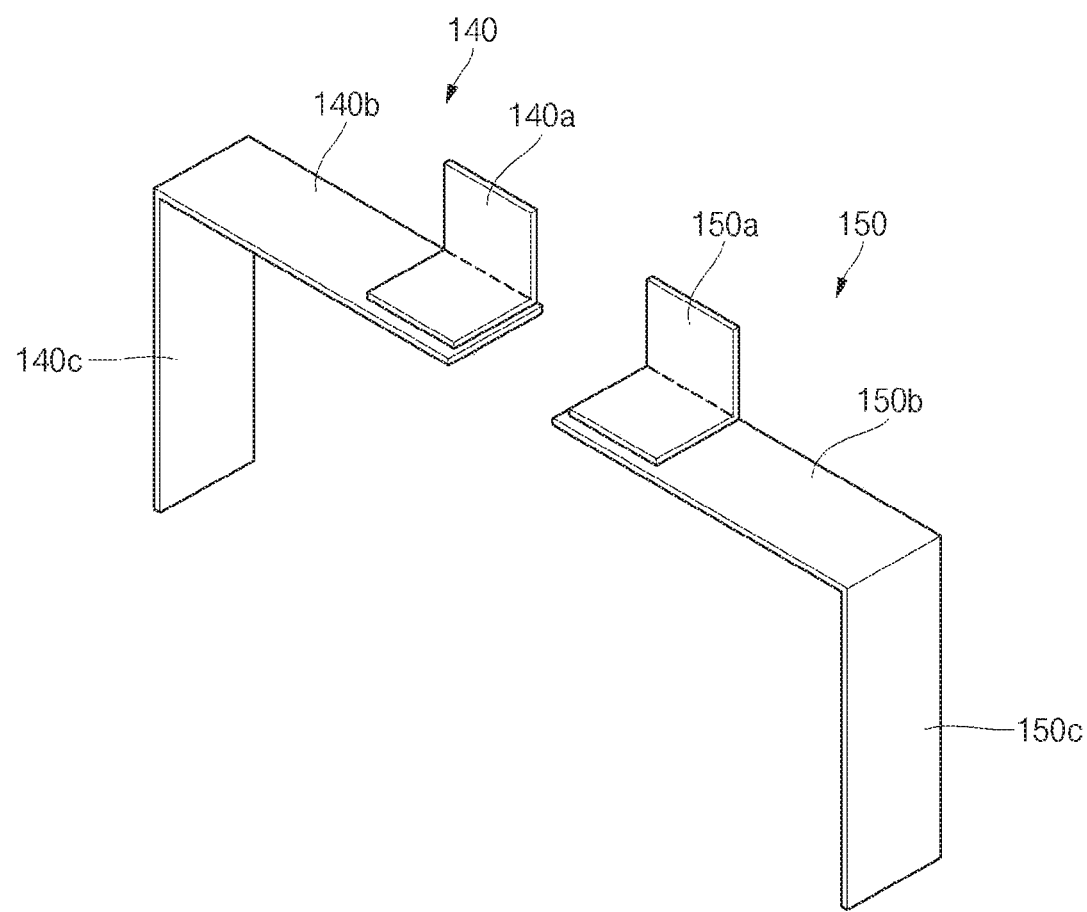

SECONDARY BATTERY

CROSS-REFERENCE TO RELATED APPLICATION(S)

This application is a National Phase Patent Application of International Patent Application Number PCT/KR2018/001945, filed on Feb. 14, 2018, which claims priority of Korean Patent Application No. 10-2017-0028522, filed Mar. 6, 2017. The entire contents of both of which are incorporated herein by reference.

TECHNICAL FIELD

Various embodiments of the present invention relate to a secondary battery.

BACKGROUND ART

In general, unlike a primary battery that cannot be charged, a secondary battery can be charged and discharged. Low-capacity secondary batteries packaged in the form of a pack including a single battery cell are used as the power source for various portable small-sized electronic devices, such as, for example, smart phones or digital cameras, camcorders. High-capacity secondary battery having several tens to several hundreds of battery cells connected to one another are used as the power source for motor drives, such as those in electric scooters, hybrid vehicles, or electric vehicles.

Secondary batteries are manufactured in various shapes including, for example, prismatic and cylindrical batteries. A secondary battery is configured such that an electrode assembly, including a separator as an insulator positioned between a positive electrode plate and a negative electrode plate, and an electrolyte are accommodated in a case and a cap plate is coupled to the case. Positive and negative electrode terminal portions are connected to the electrode assembly and are exposed or protrude to the outside through the cap plate.

The above information disclosed in this Background section is only for enhancement of understanding of the background of the described technology and therefore it may contain information that does not form the prior art that is already known in this country to a person of ordinary skill in the art.

TECHNICAL PROBLEMS TO BE SOLVED

Various embodiments of the present invention provide a secondary battery which can simplify the structure of a terminal part to minimize the space taken up by parts inside a case.

TECHNICAL SOLUTIONS

In accordance with an aspect of the present invention, the above and other objects can be accomplished by providing a secondary battery including an electrode assembly for a prismatic secondary battery, a case for a prismatic secondary battery for accommodating the electrode assembly, a cap plate coupled to the case, and a terminal part which is coupled to a side portion of the electrode assembly and is extendedly bent from the side portion to an upper portion of the electrode assembly, wherein the terminal part includes a bent part which is bent upward from an end part connected to the upper portion of the electrode assembly to protrude out of the cap plate.

In one embodiment, the terminal part may include a first area coupled to the side portion of the electrode assembly, a second area attached to the upper portion of the electrode assembly, and the bent part bent at the second area. In addition, the first area may be electrically connected to the electrode assembly at the side portion of the electrode assembly.

In one embodiment, the side portion of the electrode assembly and the wide-surface portion of the first area of the terminal part may be arranged to face each other in parallel.

In one embodiment, the bent part may be extended and bent from an end part of the second area of the terminal part in a lateral direction in which the second area connected from the first area is extended.

Preferably, the first area and the second area are bent at 90 degrees and then connected to each other, and the second area and the bent part are bent at 90 degrees in a direction different from the direction in which the first area and the second area are bent.

In one embodiment, the terminal part may include a pair of terminal parts, which are attached to opposite side portions of the electrode assembly, respectively, and may have different polarities.

The secondary battery may further include an insulating molding resin positioned between the bent part of the terminal part and a region where the bent part passes through the cap plate.

In another embodiment, the bent part may be a metal terminal bent in an L-shaped configuration and is welded to an end part of the second area so as to be coupled in a direction perpendicular to the direction in which the bent part is bent from the first area to the second area of the terminal part.

ADVANTAGEOUS EFFECTS

As described above, various embodiments of the present invention provide a secondary battery which can reduce the number of parts by integrally forming an electrode assembly terminal part and an electrode terminal part, and can directly connect the terminal parts to each other without a separate part required for providing electrical coupling of batteries.

In addition, various embodiments of the present invention provide a secondary battery which can minimize the space taken up by parts inside a case by connecting an electrode assembly terminal part and an electrode terminal part to each other on the same plane, compared to a conventional secondary battery in which an electrode assembly terminal part and an electrode terminal part are separately located.

BRIEF DESCRIPTION OF DRAWINGS

FIGS. 3 and 4 are perspective views of an electrode assembly terminal part according to various embodiments of the present invention.

BEST MODE FOR CARRYING OUT THE INVENTION

Figure 1:
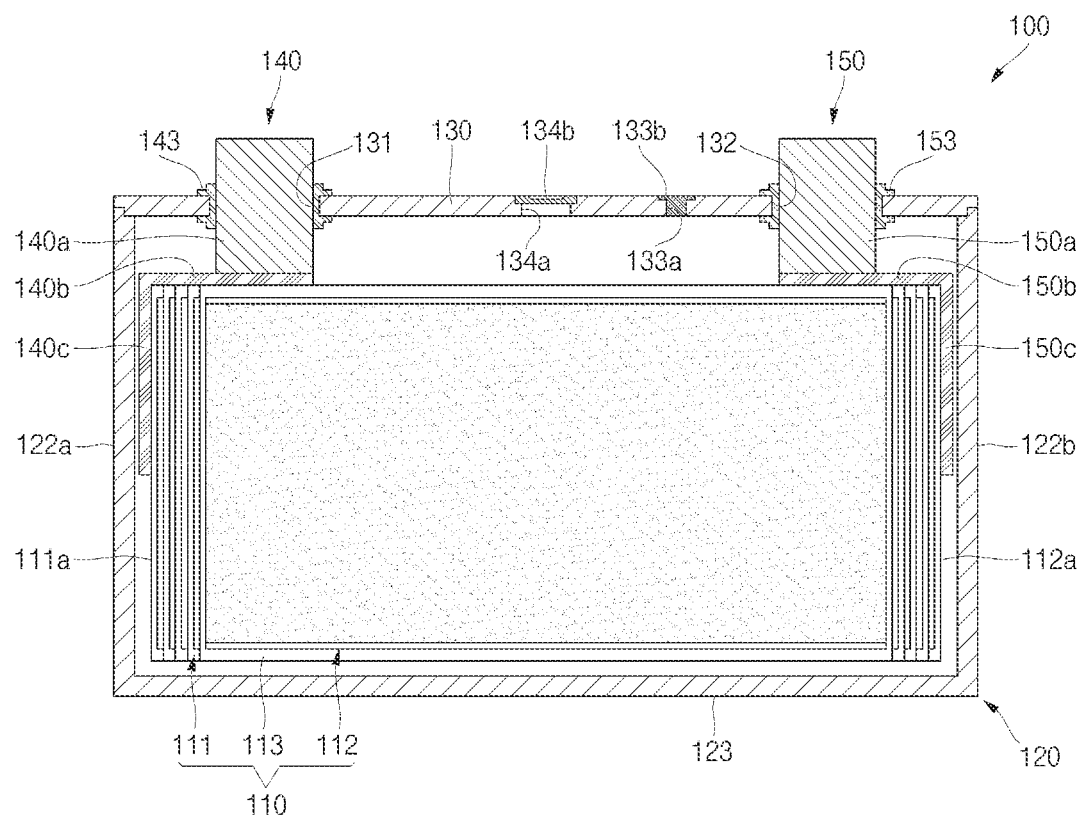
FIG. 1 is a perspective view of a secondary battery according to various embodiments of the present invention.

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 2:
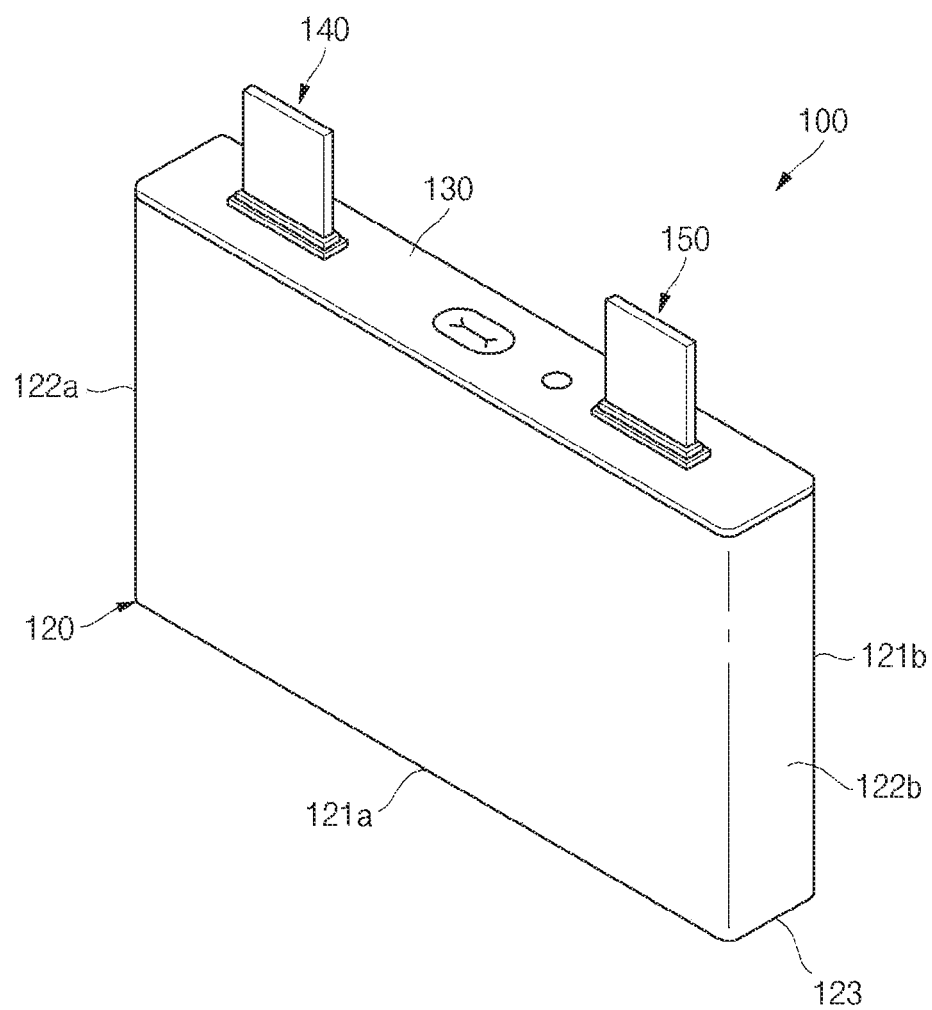
FIG. 2 is a front sectional view of a secondary battery according to various embodiments of the present invention.
Figure 3:
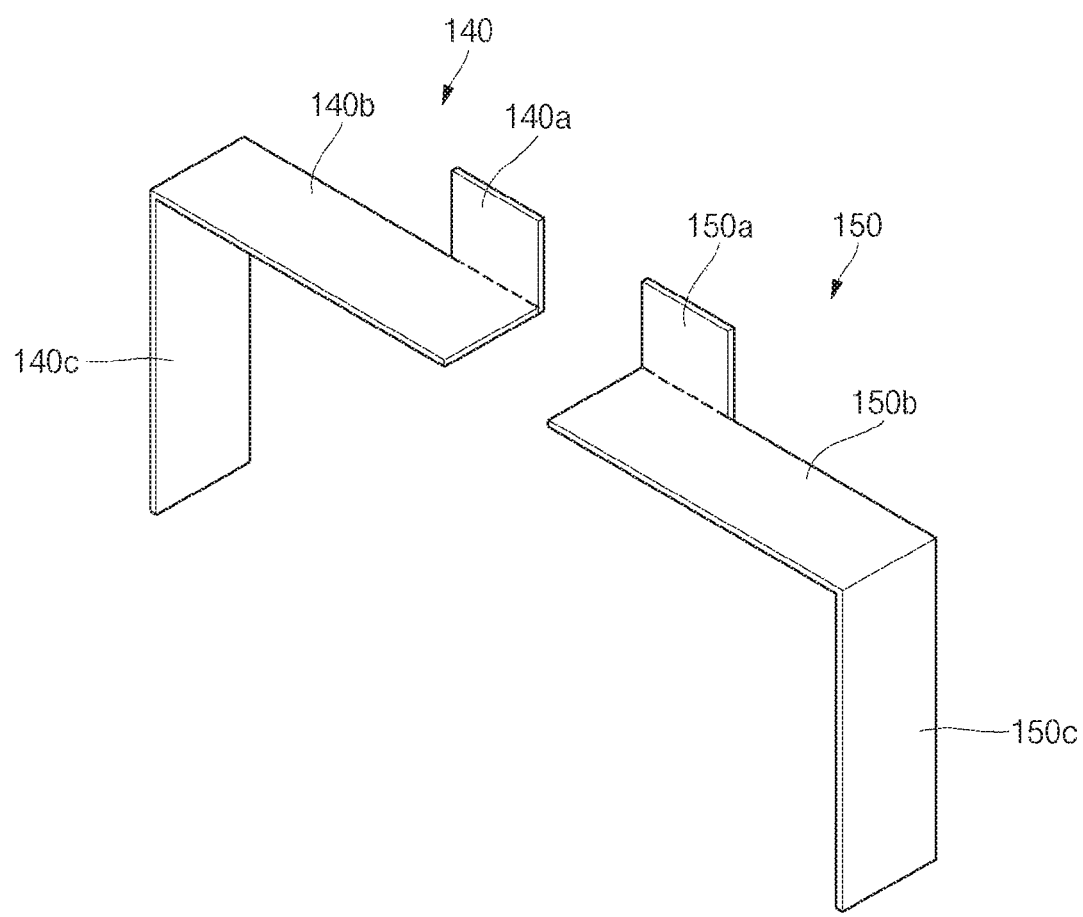

FIG. 1 is a perspective view of a secondary battery according to various embodiments of the present invention. FIG. 2 is a front sectional view of a secondary battery according to various embodiments of the present invention. FIGS. 3 and 4 are perspective views of an electrode assembly terminal part according to various embodiments of the present invention.

Referring to FIGS. 1 to 4, the secondary battery 100 according to the present invention includes an electrode assembly 110, a case 120, a cap plate 130, a first terminal part 140 and a second terminal part 150.

The electrode assembly 110 may be formed by winding or stacking a stack of a first electrode plate 111, a separator 113 and a second electrode plate 112, which are thin plates or layers. Here, the first electrode plate 111 may function as a positive electrode, and the second electrode plate 112 may function as a negative electrode, or vice versa.

The first electrode plate 111 may be formed by coating a first electrode active material, e.g., a transition metal oxide, on a first current collector made of a metal foil, e.g., aluminum foil, but aspects of the present invention are not limited thereto. The first electrode plate 111 may include a first uncoated portion (not shown) (a single tab or multi-tabs) that is not coated with the first electrode material but is laterally extended a predetermined length. The first uncoated portion may be electrically connected to a first side terminal plate 140c of the first terminal part 140 to become a path of current flow between the first electrode plate 111 and the first side terminal plate 140c.

The second electrode 112 may be formed by coating a second electrode active material, e.g., graphite or carbon, onto a second electrode collector made of a metal foil, e.g., copper or nickel, but aspects of the present invention are not limited thereto. The second electrode 112 may include a second uncoated portion (not shown) (a single tab or multi-tabs) that is not coated with the second active material but is upwardly extended a predetermined length. The second uncoated portion may be electrically connected to a second side terminal plate 150c of the second terminal part 150 to become a path of current flow between the second electrode plate 112 and the second side terminal plate 150c.

Polarities of the first electrode plate 111 and the second electrode plate 112 may be reversed. In addition, the first and second tabs may be in forms of single tabs, that is, one of the first and second tabs is upwardly extended from one of the first or second electrode plates 111 and 112, or in forms of multi-tabs, that is, multiple tabs are upwardly extended. In case of the multi-tabs, the multiple tabs may overlap one on another, and may have a larger thickness than the single tabs.

The separator 113, which is located between the positive and negative electrode plates 111 and 112, may prevent short circuits between the first and second electrode plates 111 and 112, and may allow lithium ions to move. In an implementation, the separator 113 may be made of, e.g., polyethylene, polypropylene, or a composite film of polyethylene and polypropylene. In addition, if an organic-, an organic/inorganic hybrid- or an inorganic-based solid electrolyte is position between the first and second electrode plates 111 and 112, the separator 113 may be omitted.

The electrode assembly 110 may be accommodated in, for example, but not limited to, the case 120 with an electrolyte. The electrolyte may include an organic solvent (e.g., ethylene carbonate (EC), propylene carbonate (PC), diethyl carbonate (DEC), ethyl methyl carbonate (EMC), and/or dimethyl carbonate (DMC)) and a lithium salt (e.g., $LiPF_6$ or $LiBF_4$). In an implementation, the electrolyte may be in a liquid, solid, or gel phase.

The case 120 may be made of a conductive metal, for example, but not limited to, aluminum, an aluminum alloy, steel, a steel alloy, nickel plated steel, a nickel plated steel alloy, or the like. The case 120 may have a substantially hexagonal or hexahedral structure having an open top portion so as to receive the electrode assembly 110 and portions of the first terminal part 140 and the second terminal part 150. In more detail, the case 120 may include a pair of long side regions 121a and 121b, which are relatively wide regions, a pair of short side regions 122a and 122b, which are relatively narrow regions and connect the pair of long side regions 121a and 121b, and a bottom region 123 connecting the long side regions 121a and 121b and the short side regions 122a and 122b. Here, the first uncoated portion 111a of the electrode assembly 110 may be extended a predetermined length toward a direction opposite to the bottom region 123 (i.e., upward), and the second uncoated portion 112a may also be extended a predetermined length toward the direction opposite to the bottom region 123 (i.e., upward). In addition, the first terminal part 140 may be formed in the vicinity of the short side region 122a of the case 120, and the second terminal part 150 may be formed in the vicinity of the short side region 122b of the case 120.

Meanwhile, an inner surface of the case 120 may be insulated so that the case 120 is insulated from the electrode assembly 110, the first terminal portion 140, and the second terminal portion 150. In a state in which the electrode assembly 110, the first terminal portion 140, and the second terminal portion 150 are accommodated in an insulating bag (not shown), the electrode assembly 110, the first terminal portion 140, and the second terminal portion 150 may be positioned within the case 120.

The cap plate 130 may be coupled with the case 120 at the open top portion thereof by, for example, laser welding. Accordingly, the case 120 and the cap plate 130 may be electrically connected to each other. In an implementation, the cap plate 130 may be made of the same material as the case 120. Here, the cap plate 130 and the first terminal part 140 may be electrically connected to each other. Accordingly, the cap plate 130 and the first terminal part 140 may have the same polarity. Therefore, the case 120 and the cap plate 130 may have the same polarity. Alternatively, the cap plate 130 and the second terminal part 150 may be electrically connected to each other. Accordingly, the cap plate 130 and the case 120 may have the same polarity with the second terminal part 150. Of course, the first terminal part 140 and the second terminal part 150 may not be electrically connected to the cap plate 130 at the same time.

The cap plate 130 may include a first terminal hole 131 penetrating the cap plate 130 to accommodate the first terminal portion 140 and a second penetration hole 132 penetrating the cap plate 130 to accommodate the second terminal portion 150. In addition, the cap plate 130 may further include an injection hole 133a for supplying an electrolyte and a plug 133b coupled with the injection hole 133a. In addition, when an internal pressure of the case 120 exceeds a reference pressure, the cap plate 130 may include a vent hole 134a allowing internal gases to be easily discharged, and a safety vent 134b that is coupled to the vent hole 134a and is relatively thin.

The first terminal part 140 may be made of a metal and may be electrically connected to the first electrode plate 111. The first terminal part 140 may include the first side terminal plate 140c, the first upper terminal plate 140b and a first terminal tab bent part 140a.

The first side terminal plate 140c (i.e., a first current collector plate) is brought into contact with the first uncoated portion protruding to a lateral end of the electrode assembly 110 to then be electrically connected. Practically, the first side terminal plate 140c is welded to the first uncoated portion. The first side terminal plate 140c may be configured such that it is attached to a side surface of the electrode assembly 110. Here, the first side terminal plate 140c (i.e., the first current collector plate) is attached to the side surface of the electrode assembly 110 such that a wide-surface portion of the first side terminal plate 140c faces the side surface of the electrode assembly 110 in parallel.

The first upper terminal plate 140b is made of the same material with the first side terminal plate 140c and is extended from the first side terminal plate 140c to then be attached to a top end of the electrode assembly 110. In a case of the prismatic secondary battery 100, top and side surfaces of the electrode assembly 110 are generally at 90 degrees. Thus, the first upper terminal plate 140b is bent at 90 degrees with respect to the first side terminal plate 140c to then be extended. Accordingly, the first upper terminal plate 140b and the first side terminal plate 140c are roughly in a clockwise 90 degree rotated L-shaped (⌐) configuration.

The first terminal tab bent part 140a is bent at an end part of the first upper terminal plate 140b and is upwardly extended. The first terminal tab bent part 140a may be bent from a longitudinal side surface at the end part of the first upper terminal plate 140b to then be upwardly extended. Alternatively, the first terminal tab bent part 140a may be bent in a longitudinal direction to then be upwardly extended. However, as shown in FIG. 3, since the first terminal tab bent part 140a is generally attached to the side surface of the electrode assembly 110 such that it is extended along the longitudinal side surface, the first terminal tab bent part 140a is preferably extended to then be bent in a lateral direction with respect to directions in which the first upper terminal plate 140b and the first side terminal plate 140c are extended.

In addition, the first terminal tab bent part 140a may be fabricated as a separate part, rather than being bent and extended from the first upper terminal plate 140b, to then be welded and coupled to the end part of the first upper terminal plate 140b.

Referring to FIG. 4, the first terminal tab bent part 140a is an electrode terminal bent in an 'L-shaped' configuration and is welded in the longitudinal direction of the first upper terminal plate 140b. That is to say, the first terminal tab bent part 140a is welded so as to be bent at 90 degrees with respect to the direction in which the first terminal tab bent part 140a is bent from the first side terminal plate 140c toward the first upper terminal plate 140b.

However, the direction or location in which the first terminal tab bent part 140a is extended or bent may not be limited to those of the embodiments shown in FIGS. 3 and 4, but the first terminal tab bent part 140a may be extended or bent in various directions or locations according to the direction in which the terminal is located. In addition, the first terminal tab bent part 140a upwardly protrude and extend a predetermined length while passing through a cap plate 130 to be described later.

Meanwhile, the first terminal part 140 is made of, for example, but not limited to, copper, a copper alloy, aluminum or an aluminum alloy.

In addition, an insulating molding resin 143 covers the first terminal tab bent part 140a at a region where the first terminal tab bent part 140a passes through the cap plate 130. In addition, the insulating molding resin 143 is located on top and bottom surfaces of the cap plate 130 around the first terminal tab bent part 140a to a predetermined thickness.

Here, the insulating molding resin 143 is preferably made of a material that can be applied to a molding process without reacting with an electrolyte. Specifically, the insulating molding resin 143 may include one selected from the group of fluorine resin, polyethylene (PE) resin, polypropylene (PP) resin, ethylene propylene diene monomer (EPDM) resin, and equivalents thereof, but aspects of the present invention are not limited thereto.

The second terminal part 150 is also made of a metal and is electrically connected to the second electrode plate 112.

The second terminal part 150 includes a second side terminal plate 150c, a second upper terminal plate 150b and a second terminal tab bent part 150a.

The second side terminal plate 150c (i.e., a second current collector plate) is brought into contact with the second uncoated portion protruding to a lateral end of the electrode assembly 110 to then be electrically connected. Practically, the second side terminal plate 150c is welded to the second uncoated portion. The second side terminal plate 150c may be configured such that it is attached to a side surface of the electrode assembly 110. In this case, the second side terminal plate 150c (i.e., the second current collector plate) is also attached to the side surface of the electrode assembly 110 such that the side surface of the electrode assembly 110 and a wide-surface portion of the second side terminal plate 150c are arranged to face each other in parallel.

The second upper terminal plate 150b is made of the same material with the second side terminal plate 150c and is extended from the second side terminal plate 150c to then be attached to the top end of the electrode assembly 110. In a case of the prismatic secondary battery 100, top and side surfaces of the electrode assembly 110 are generally at 90 degrees. Thus, the second upper terminal plate 150b is bent at 90 degrees with respect to the second side terminal plate 150c to then be extended. Accordingly, the second upper terminal plate 150b and the second side terminal plate 150c are roughly in a counterclockwise 90 degree rotated L-shaped (¬) configuration.

The second terminal tab bent part 150a is bent at an end part of the second upper terminal plate 150b and is upwardly bent and extended. The second terminal tab bent part 150a may be bent from a longitudinal side surface at the end part of the second upper terminal plate 150b to then be upwardly extended. Alternatively, the second terminal tab bent part 150a may be bent in a longitudinal direction to then be upwardly extended. However, as shown in FIG. 3, since the second terminal tab bent part 150a is generally attached to the side surface of the electrode assembly 110 such that it is extended along the longitudinal side surface, the second terminal tab bent part 150a is preferably extended to then be bent in a lateral direction with respect to directions in which the second upper terminal plate 150b and the second side terminal plate 150c are extended.

In addition, the second terminal tab bent part 150a may be fabricated as a separate part, rather than being bent and extended from the second upper terminal plate 150b, to then be welded and coupled to the end part of the second upper terminal plate 150b.

Referring to FIG. 4, the second terminal tab bent part 150a is an electrode terminal bent in an 'L-shaped' configuration and is welded in the longitudinal direction of the second upper terminal plate 150b. That is to say, the second terminal tab bent part 150a is welded to be bent at 90 degrees with respect to the direction in which the second terminal tab bent part 150a is bent from the second side terminal plate 150c toward the second upper terminal plate 150b.

However, the direction or location in which the second terminal tab bent part 150a is bent may not be limited to those of the embodiments shown in FIGS. 3 and 4, but which the second terminal tab bent part 150a may be extended or bent in various directions or locations according to the terminal forming direction. In addition, the second terminal tab bent part 150a upwardly protrude and extend a predetermined length while passing through the cap plate 151 to be described later.

Meanwhile, the second terminal part 150 is made of, for example, but not limited to, copper, a copper alloy, aluminum or an aluminum alloy.

In addition, an insulating molding resin 153 covers the second terminal tab bent part 150a at a region where the second terminal tab bent part 150a passes through the cap plate 130. In addition, the insulating molding resin 153 is located on top and bottom surfaces of the cap plate 130 around the second terminal tab bent part 150a to a predetermined thickness.

Here, the insulating molding resin 153 may be made of the same material with the insulating molding resin 143.

Various embodiments of the present invention provide a secondary battery which can reduce the number of parts by integrally forming an electrode assembly terminal part and an electrode terminal part, and can directly connect the terminal parts to each other without a separate part required for providing electrical coupling of batteries.

In addition, various embodiments of the present invention provide a secondary battery which can minimize the space taken up by parts inside a case by connecting an electrode assembly terminal part and an electrode terminal part to each other on the same plane, compared to a conventional secondary battery in which an electrode assembly terminal part and an electrode terminal part are separately located.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

INDUSTRIAL APPLICABILITY

The present invention relates to a secondary battery.
The invention claimed is:
1. A secondary battery comprising:
an electrode assembly for a prismatic secondary battery;
a case for the prismatic secondary battery for accommodating the electrode assembly;
a cap plate coupled to the case; and
a terminal part comprising:
  a first area which is coupled perpendicularly to an end of a side portion of the electrode assembly;
  a second area bent relative to the first area and longitudinally extending in a lengthwise direction along an upper portion of the electrode assembly, and wherein the second area is attached to the upper portion of the electrode assembly; and
  a bent part which is bent upward from the second area attached to the upper portion of the electrode assembly to protrude out of the cap plate,
wherein a planar surface of the second area is parallel to the cap plate,
wherein a planar surface of the first area is parallel to the side portion of the electrode assembly and to a side wall of the case,
wherein the bent part extends along and upward from a longitudinal edge of the planar surface of the second area, the longitudinal edge extending in the lengthwise direction along the upper portion of the electrode assembly,
wherein a planar surface of the bent part is perpendicular to each of the planar surface of the first area and the planar surface of the second area,
wherein the bent part is laterally offset relative to a longitudinal centerline of the planar surface of the second area, and wherein the first area and the second area are connected to each other and bent at 90 degrees, and a portion of the second area and the bent part are connected to each other and bent at 90 degrees in a direction different from the direction in which the first area and the second area are bent.

2. The secondary battery of claim 1, wherein the second area is attached to the upper portion of the electrode assembly.

3. The secondary battery of claim 2, wherein the first area is electrically connected to the electrode assembly at the side portion of the electrode assembly.

4. The secondary battery of claim 2, wherein the bent part is extended and bent from an end part of the second area of the terminal part in a lateral direction in which the second area connected from the first area is extended.

5. A secondary battery comprising:
an electrode assembly for a prismatic secondary battery;
a case for the prismatic secondary battery for accommodating the electrode assembly;
a cap plate coupled to the case; and
a terminal part comprising:
a first area which is coupled to a side portion of the electrode assembly;
a second area bent relative to the first area and longitudinally extending lengthwise along an upper portion of the electrode assembly, and wherein the second area is attached to the upper portion of the electrode assembly; and
a bent part which is bent upward from the second area attached to the upper portion of the electrode assembly to protrude out of the cap plate,
wherein a planar surface of the second area is parallel to the cap plate,
wherein a planar surface of the first area is parallel to the side portion of the electrode assembly and to a side wall of the case,
wherein the bent part extends along and upward from a longitudinal edge of the planar surface of the second area, the longitudinal edge extending lengthwise along the upper portion of the electrode assembly,
wherein a planar surface of the bent part is perpendicular to each of the planar surface of the first area and the planar surface of the second area,
wherein the second area is attached to the upper portion of the electrode assembly,
wherein the bent part is extended and bent from an end part of the second area of the terminal part in a lateral direction in which the second area connected from the first area is extended, and
wherein the first area and the second area are connected to each other and bent at 90 degrees, and a portion of the second area and the bent part are connected to each other and bent at 90 degrees in a direction different from the direction in which the first area and the second area are bent.

6. The secondary battery of claim 1, wherein the terminal part includes a pair of terminal parts, which are attached to opposite side portions of the electrode assembly, respectively, and have different polarities.

7. The secondary battery of claim 1, further comprising an insulating molding resin positioned between the bent part of the terminal part and a region where the bent part passes through the cap plate to then upwardly extend.

8. The secondary battery of claim 1, wherein the bent part is a metal terminal bent in an L-shaped configuration and is welded to an end part of the second area so as to be coupled in a direction perpendicular to the direction in which the bent part is bent from the first area to the second area of the terminal part.

9. The secondary battery of claim 3, wherein the side portion of the electrode assembly and a wide-surface portion of the first area of the terminal part are arranged to face each other in parallel.

* * * * *